(12) United States Patent
Bonardi et al.

(10) Patent No.: US 11,175,237 B2
(45) Date of Patent: Nov. 16, 2021

(54) INSPECTION MACHINE

(71) Applicant: ANTARES VISION S.P.A., Travagliato (IT)

(72) Inventors: Massimo Bonardi, Travagliato (IT); Emidio Zorzella, Travagliato (IT)

(73) Assignee: ANTARES VISION S.P.A., Travagliato (IT)

( * ) Notice: Subject to any disclaimer, the term of this patent is extended or adjusted under 35 U.S.C. 154(b) by 137 days.

(21) Appl. No.: 16/496,869

(22) PCT Filed: Feb. 26, 2018

(86) PCT No.: PCT/EP2018/054688
§ 371 (c)(1),
(2) Date: Sep. 23, 2019

(87) PCT Pub. No.: WO2018/172017
PCT Pub. Date: Sep. 27, 2018

(65) Prior Publication Data
US 2020/0110042 A1 Apr. 9, 2020

(30) Foreign Application Priority Data
Mar. 23, 2017 (IT) .................. 102017000032261

(51) Int. Cl.
*G01N 21/90* (2006.01)
*G01N 21/84* (2006.01)

(52) U.S. Cl.
CPC ..... *G01N 21/9009* (2013.01); *G01N 21/9027* (2013.01); *G01N 2021/845* (2013.01); *G01N 2201/021* (2013.01); *G01N 2201/0415* (2013.01)

(58) Field of Classification Search
CPC .......... G01N 21/9009; G01N 21/9027; G01N 2021/845; G01N 2201/0415; G01N 2201/021
See application file for complete search history.

(56) References Cited

U.S. PATENT DOCUMENTS 4,050,824 A * 9/1977 Woodrow .......... G01N 21/9009
356/427
4,241,256 A 12/1980 Tagaya et al.
(Continued)

FOREIGN PATENT DOCUMENTS

EP 0 701 117 A2 3/1996
WO 2016166668 A1 10/2016

OTHER PUBLICATIONS

International Search Report issued in corresponding International Patent Application No. PCT/EP2018/054688 dated May 2, 2018.

*Primary Examiner* — Sang H Nguyen
(74) *Attorney, Agent, or Firm* — Troutman Pepper Hamilton Sanders LLP

(57) ABSTRACT

The automatic inspection machine for containers and contents thereof, comprises a serial horizontal conveyor line of the containers oriented with a vertical axis through at least one inspection station comprising lighting means of the containers, at least one television camera for acquiring images of the illuminated containers, the lighting means comprising a first, a second and at least a third lighting device.

13 Claims, 5 Drawing Sheets

(56) References Cited

U.S. PATENT DOCUMENTS

| | | | | |
|---|---|---|---|---|
| 4,492,475 | A * | 1/1985 | Takahashi | G01N 21/9027 356/239.6 |
| 4,500,203 | A * | 2/1985 | Bieringer | G01N 21/9036 209/525 |
| 5,404,227 | A * | 4/1995 | Sumita | B07C 5/126 198/343.1 |
| 5,719,679 | A * | 2/1998 | Shimizu | G01N 21/9027 356/428 |
| 6,473,169 | B1 * | 10/2002 | Dawley | G01M 3/3263 250/223 B |
| 6,781,689 | B2 * | 8/2004 | Chiba | G01N 21/9027 356/239.6 |
| 7,295,317 | B2 * | 11/2007 | Niedermeier | G01N 21/9027 250/223 B |
| 2009/0279082 | A1 * | 11/2009 | Till | B07C 5/3408 356/240.1 |
| 2014/0268123 | A1 | 9/2014 | Juvinall et al. | |
| 2019/0271714 | A1 * | 9/2019 | Kluckner | G01N 21/25 |

* cited by examiner

INSPECTION MACHINE

CROSS REFERENCE TO RELATED APPLICATIONS

This is a U.S. National Phase Application under 35 U.S.C. § 371 of International Patent Application No. PCT/EP2018/054688, filed Feb. 26, 2018, which claims priority of Italian Patent Application No. 102017000032261, filed Mar. 23, 2017. The entire contents of which are hereby incorporated by reference.

FIELD OF THE INVENTION

The present invention relates to an automatic inspection machine for containers and the contents of containers containing a pharmaceutical product, a food product, or products of other nature.

BACKGROUND

Inspection machines are currently known that comprise a carousel conveying the containers through a series of inspection stations formed, in the minimum configuration, by a lighting device which projects a light on the container and a television camera which acquires an image of the container.

The inspection machine, once the non-compliance of a container has been ascertained, is able to reject it automatically from the line due to a specially-made software program.

The most common defects to be detected, in the case of containers made of glass, relate to the presence therein of dark stains, air bubbles, scratches or crack lines, and the presence of damage or missing parts in the relative caps.

Obviously it is also necessary to discriminate between any different types of defects in the product inside the containers.

In the case of solutions, the issue is in particular about mobile, undissolved, foreign particles, which can derive from the environment or the process.

In the specific case of lyophilised products ("freeze-dried"), the inspection is mainly directed to visually identifying foreign bodies on the surface of the pod of product, which in general appear as dots or stains of a dark color.

However, the morphology itself of the pod of lyophilised product has various ripples which create various shadowings that make impossible the discrimination between the shadow itself and any foreign body having a dark color.

SUMMARY OF THE INVENTION

The technical task of the present invention is, therefore, to provide an automatic inspection machine which obviates the above-described technical drawbacks of the prior art.

Within the scope of this technical task an object of the invention is to realize an automatic inspection machine that is effective and efficient in discriminating defects, in particular, though not limitedly, in lyophilised products contained in glass containers.

The technical task, as well as these and other objects, according to the present invention are achieved by realizing an automatic inspection machine for containers and contents thereof, comprising a serial horizontal conveyor line of the containers oriented with a vertical axis through at least one inspection station comprising lighting means of the containers, at least one television camera for acquiring images of the illuminated containers, wherein said lighting means comprise a first, a second and at least a third lighting device.

In a preferred embodiment of the invention, said first, second and third lighting devices have projection axes converging on a same transit zone of said containers. In a preferred embodiment of the invention said projection axes converge with different angles on said transit zone of said containers.

In a preferred embodiment of the invention said first, second and third lighting devices are positioned on opposite sides of said conveyor line so as to illuminate said transit zone of said containers from opposite sides.

In a preferred embodiment of the invention at least said first and second lighting devices have a projection axis inclined from the top to the bottom.

In a preferred embodiment of the invention said third lighting device emits a colored light.

In a preferred embodiment of the invention said third lighting device has a projection axis inclined from the bottom to the top.

The inspection station configured in this way is particularly suitable for the inspection of the upper surface of the pod of a lyophilised product contained in a glass container as it provides an effective and efficient solution for the acquired images to be of a proper quality for a computerized analysis thereof not to result in false positives.

The solution with the colored light lighting device further aids the creation of a contrast that maximizes the presence of the foreign bodies, eliminating shadowy areas.

Other characteristics of the present invention are further defined in the other dependent claims.

Further characteristics and advantages of the invention will be more evident from the description of a preferred but not exclusive embodiment of the automatic inspection machine according to the invention, illustrated by way of indicative but non-limiting example in the accompanying drawings, in which:

Figure 1:
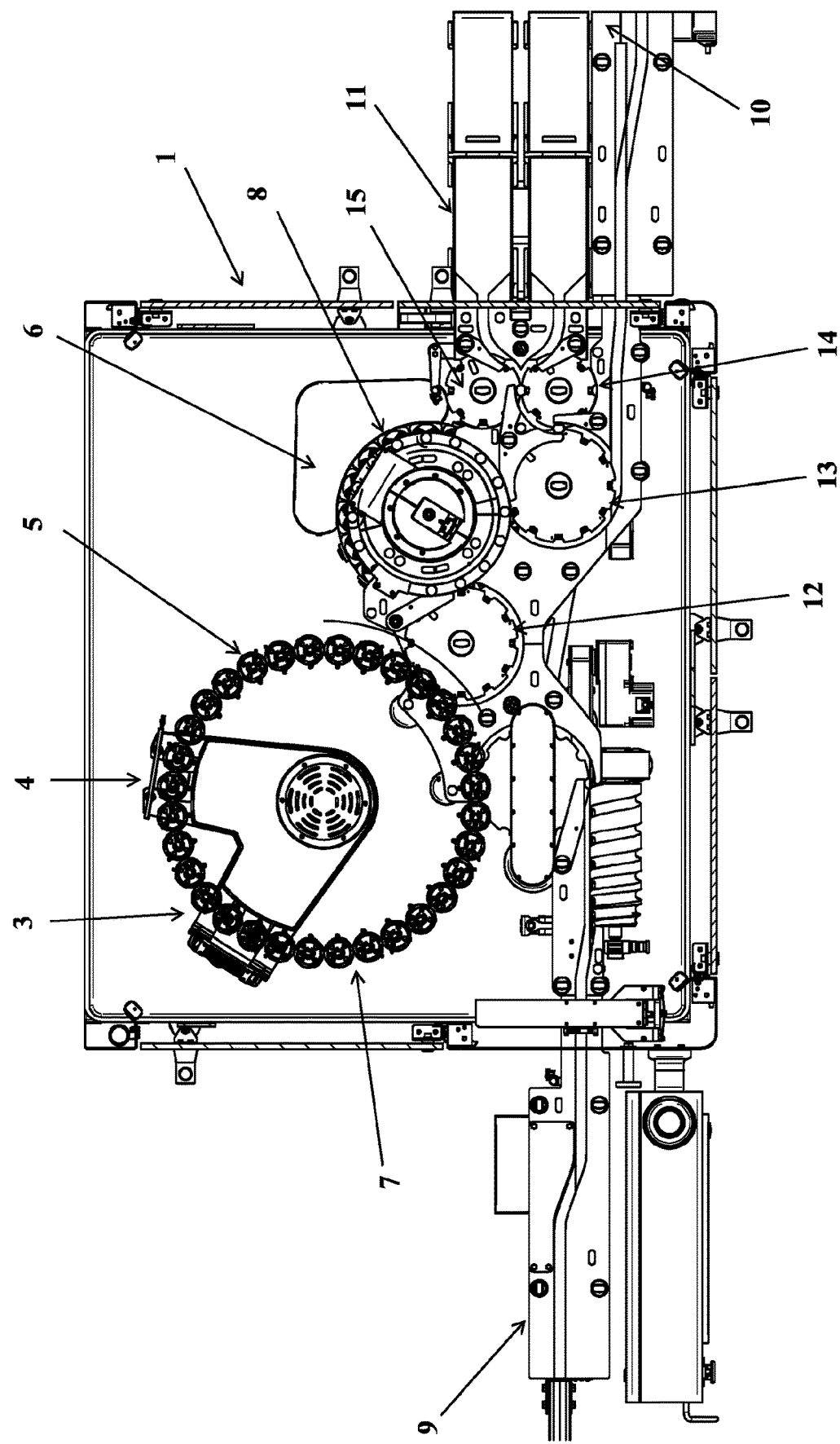
FIG. 1 shows a schematic plan view of a general layout of the inspection machine.
Figure 2:
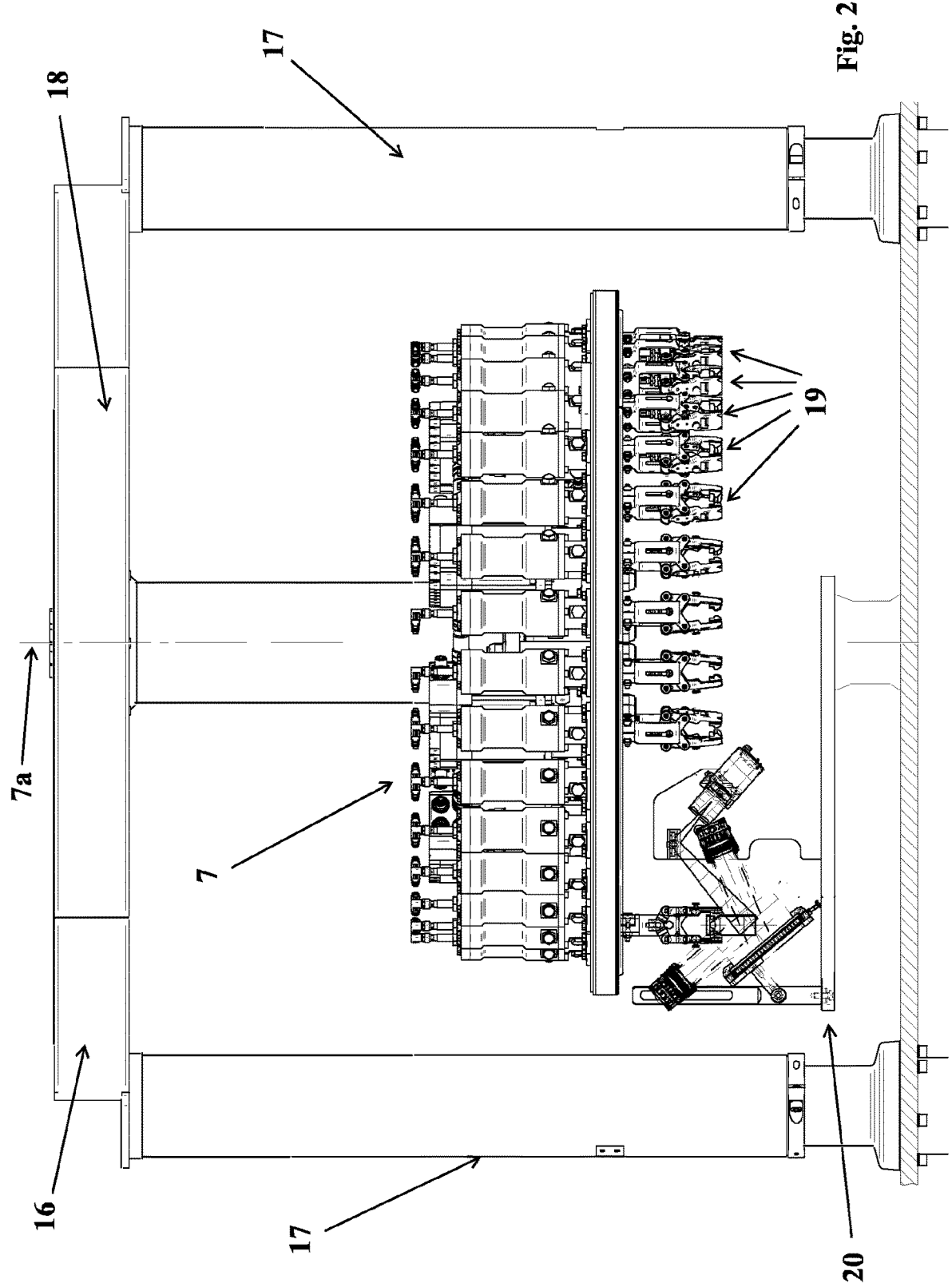
FIG. 2 shows a side elevation view of the zone of the inspection machine where the inspection station of the invention is provided.
Figure 3:
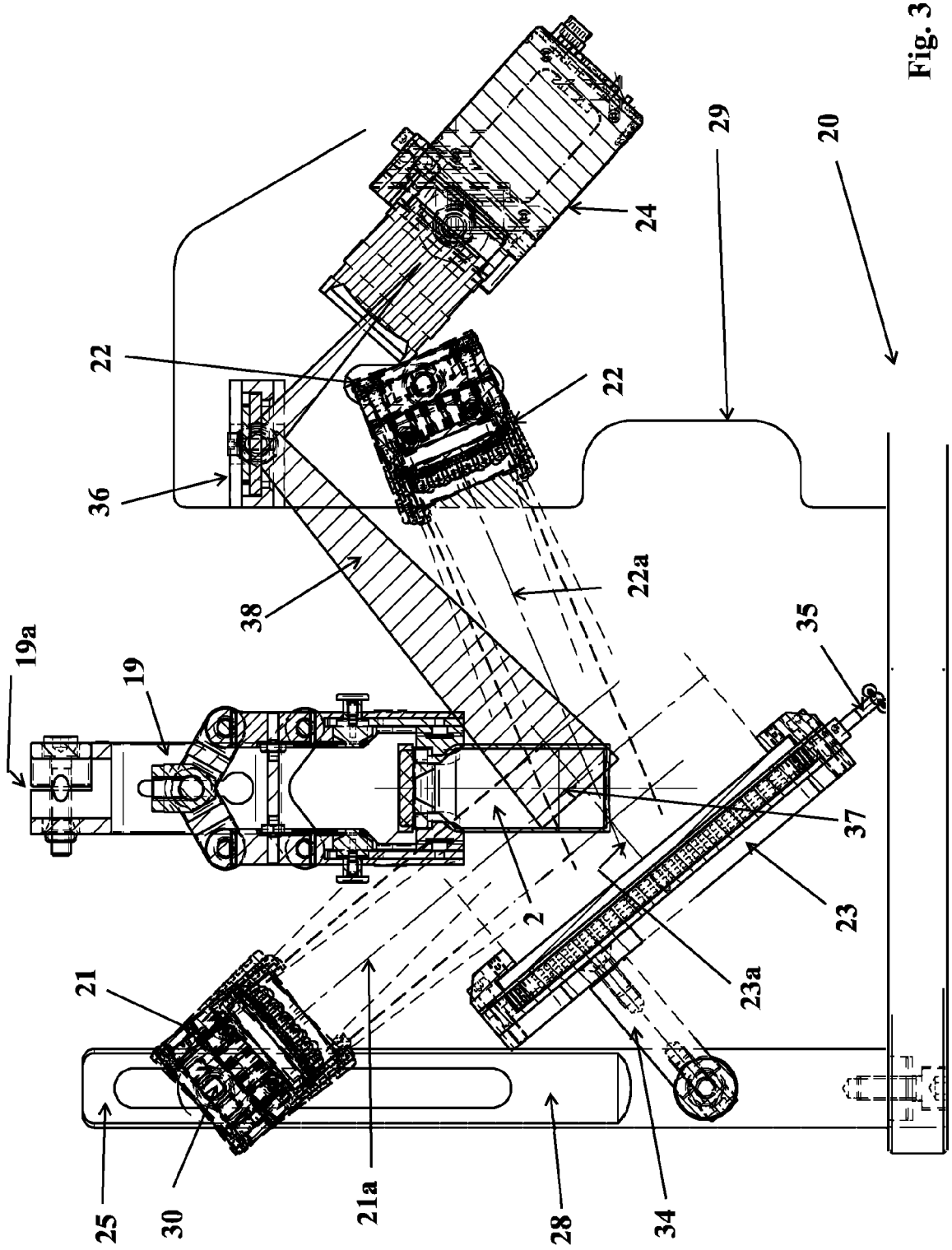
FIG. 3 shows a side elevation view of the inspection station of the invention.
Figure 4:
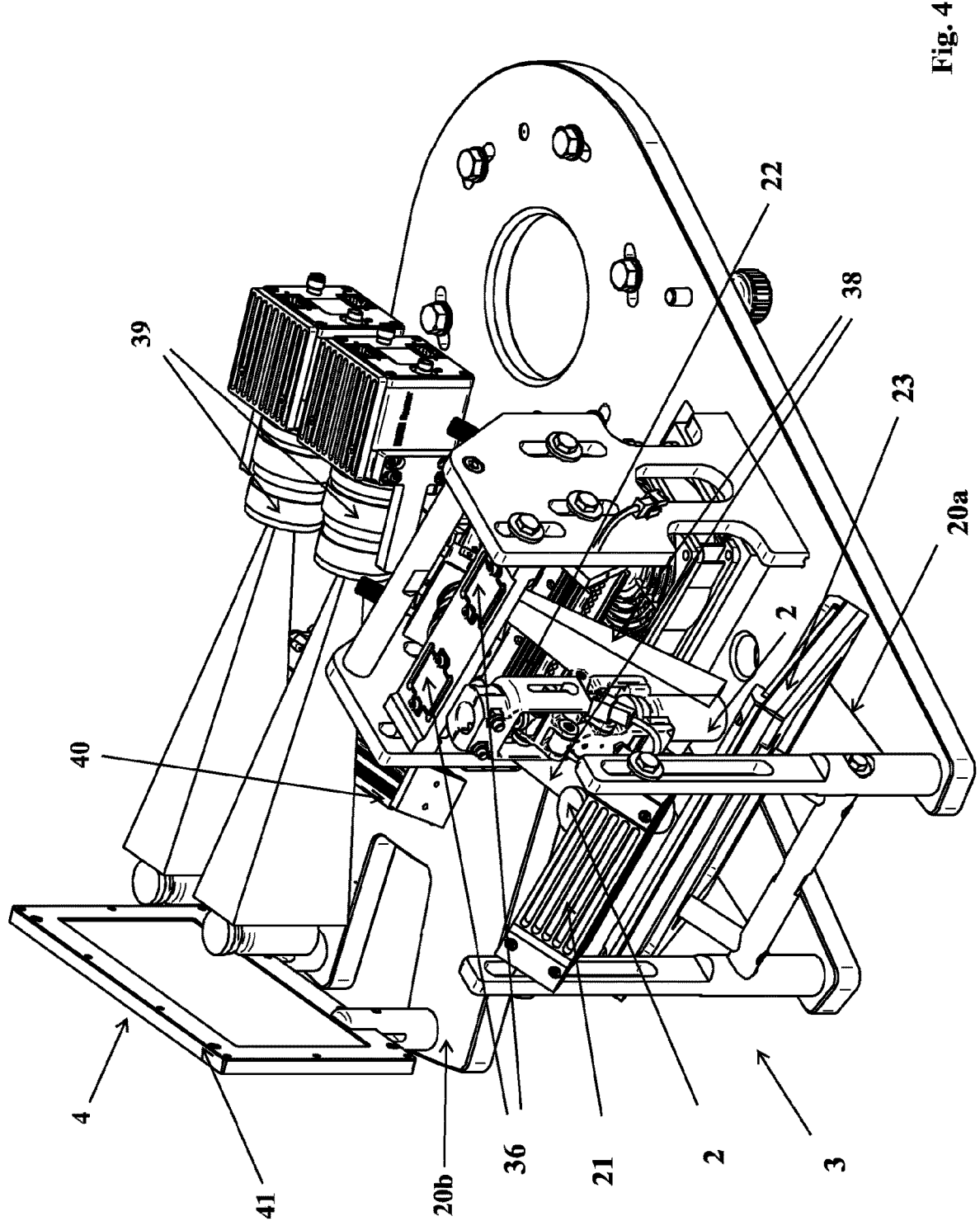
FIGS. 4 and 5 show a perspective view of the inspection station of the invention.
Figure 5:
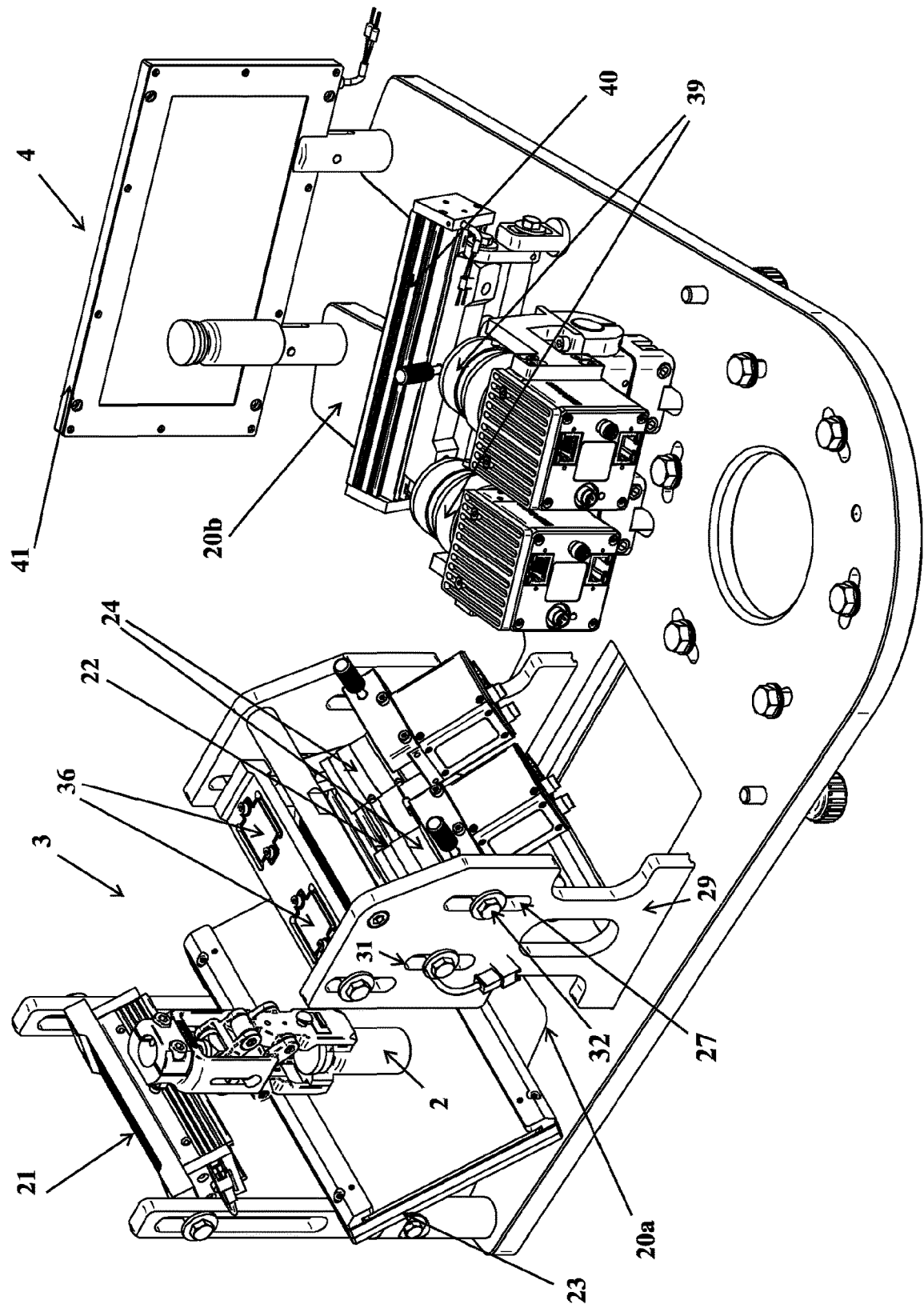

With reference to the above-mentioned figures, an automatic inspection machine for containers and the contents thereof is shown, denoted in its entirety by reference numeral 1.

DETAILED DESCRIPTION OF THE INVENTION

The illustrated inspection machine 1 is specially configured for the inspection of capped glass containers 2 containing a lyophilised product of a pharmaceutical, food, or other type.

Naturally the field of application of the inspection machine can also be extended to other types of containers and products contained therein.

The inspection machine 1 has a serial conveyor line of the containers 2 through a series of inspection stations 3, 4, 5 and 6.

In detail, the first station 3 is configured for inspection from above of the containers 2 and of the upper surface of the pod of lyophilised product contained therein, the second station 4 is configured for side inspection of the containers 2 and of the pod of lyophilised product, the third station 5 is configured for the inspection from below of the containers 2 and of the pod of lyophilised product, and the fourth station 6 is configured for the inspection of the cap of the containers 2.

The conveyor line comprises an inlet section 9, an outlet section 10 of the compliant containers 2, an outlet section 11 of the non-compliant containers 2, and a series of rotating carousels 7, 8, 12, 13, 14, 15.

A first rotating carousel 7 is dedicated to the first inspection station 3, and in the particular case, though not necessarily, also to the second and third inspection stations 4 and 5.

A second rotating carousel 8 is dedicated to the fourth inspection station 6.

A rotating relay carousel 12 is interposed between the first rotating carousel 7 and the second rotating carousel 8.

A rotating relay carousel 13 is interposed between the second rotating carousel 8 and the outlet section 10 of the compliant containers 2.

Rotating relay carousels 14, 15 are interposed between the second rotating carousel 8 and the outlet section 11 of the non-compliant containers.

Naturally the foregoing is only one possible layout from among the various possible layouts of the inspection machine, which can have a conveyor line configured differently and/or a number of different stations by number but also by type.

The inspection stations 4, 5 and 6 downstream of the inspection station from above 3 can be of known type and will not therefore be discussed in detail.

The conveyor line is configured for horizontal transport of the containers 2 oriented with a vertical axis through the inspection stations 3, 4, 5 and 6.

The rotating carousels 7, 8, 12, 13, 14, 15 are consequently arranged in horizontal planes and rotate about the respective vertical axes.

Reference is now made to the top inspection station 3 and to the section of the conveyor line dedicated thereto, comprising the first carousel 7.

The carousel 7, in the form of a circular disc, is supported in overhead suspension by a horizontal shelf 18 of a framework 16 that has telescopic vertical support columns 17 of the shelf 18 positioned radially externally of the perimeter circumference of the carousel 7.

The carousel 7 has a series of suspension pliers 19 distributed along the perimeter thereof.

The suspension pliers 19 are supported rotatingly about a vertical axis thereof 19*a*.

Special actuators of known type (not shown) are interlocked to the rotation movement and the opening/closing movement of the suspension pliers 19.

The telescopic columns 17 are adjustable for maintaining the bottom of the containers 2 to a fixed reference height on varying of the height of the batch of containers 2 which on each occasion is loaded into the machine.

The conveyor line is actuated with a continuous movement by a special motorisation (not shown).

The inspection station 3 is mounted on an oscillating support 20.

The oscillating support 20 is positioned below the carousel 7.

The oscillating support 20 oscillates about the same rotation axis 7*a* as the carousel 7.

The oscillating support 20 has the shape of a plate arranged in a horizontal plane and having a first and a second arm 20*a*, 20*b* which extend at different angles with respect to the oscillation axis 7*a* of the oscillating support 20.

The top inspection station 3 is mounted on the first arm 20*a* of the oscillating support 20.

The side inspection station 4 is mounted on the second arm 20*b* of the oscillating support 20.

In a different embodiment of the invention the conveyor line can have a stepped movement and the support of the inspection station 3 can be a fixed support that can have a different configuration and be exclusively dedicated to the support of the top inspection station 3 or also other inspection stations.

The top inspection station 3 comprises lighting means 21, 22, 23 of the containers 2 and one or more television cameras 24 for acquiring images of the illuminated containers 2.

The lighting means advantageously comprises at least a first lighting device 21, a second lighting device 22 and a third lighting device 23.

The lighting devices 21, 22, 23 preferably emit stroboscopic light.

The support 20 provides special regulating means of the linear and angular position of the lighting devices 21, 22 and 23 and of the television cameras 24.

In particular the regulating means for the first lighting device 21, the second lighting device 22 and the television cameras 24 comprises vertical guides 25, 26, 27 afforded on brackets 28, 29 which extend orthogonally above the support 20.

The horizontal axes 30, 31, 32, rotatable about themselves, are slidably constrained to the vertical guides 25, 26, 27, and support the first lighting device 21, the second lighting device 22 and respectively the television cameras 24.

The horizontal axes 30, 31, 32 in particular are bolted to the brackets 28, 29, so that the angular and linear position of the lighting devices 21 and 22 and the television cameras 24 can be regulated simply by loosening and re-tightening the bolts.

The regulating means for the third lighting device 23 instead comprises an adjustable rest foot 35 to the support 20 and an oscillatable support arm 34 pivoted to the bracket 28.

Obviously the regulating means can have a different structure from the one described in the foregoing by way of example.

The lighting devices 21, 22, and 23 have projection axes 21*a*, 22*a* and respectively 23*a* converging at different angles on a same transit zone 37 of the containers 2. The lighting devices 21, 22 and 23 are positioned on opposite sides of the conveyor line so as to illuminate the transit zone 37 of the containers 2 from opposite sides.

More precisely, the first and second lighting devices 21 and 22 are positioned on opposite sides of the conveyor line and have projection axes 21*a* and 22*a* inclined from the top to the bottom.

The third lighting device 23 instead has a projection axis 23*a* that is inclined from the bottom to the top and is positioned on the opposite side to the television cameras 24 with respect to the conveyor line.

The third lighting device 23 emits a colored light, for example for this purpose it has a colored screen.

The use of a red-colored light has been found to be advantageous for inspection of a white or light-colored lyophilised product.

The feeding speed of the conveyor line, the velocity and the arc of oscillation of the support 20 and the rotation speed of the suspension pliers 19 are selected in such a way that the top inspection station 3 tracks the containers 2 for the whole time necessary for the containers 2 to carry out a rotation of 360° about themselves.

In the illustrated case, only by way of example two television cameras 24 are provided, each one dedicated to the inspection of a corresponding container 2.

During the arc of forward oscillation of the support 20, each television camera 24 has its framing on the corresponding container 2 which advances along the conveyor line by carrying out a rotation about itself of 360°, and at the end of the forward oscillation the support 20 carries out an oscillation in the opposite direction with which the television cameras 24 move the framing onto the two successive containers 2 so as to commence the following inspection operation. The inspection cycle thus provides a tracking time of two containers 2, in which the inspection station moves in the same direction as the two containers 2 being inspected, and a return time, in which the inspection station moves in the opposite direction so as to position the framing onto the two following containers to be inspected.

For the purposes of optimization of the occupation of space, the support 20 supports mirrors 36 which reflect downwards the light ray 38 directed upwards coming from the transit zone 37 and thus enable locating the television cameras 24 in an appropriate position for acquiring the image.

The support 20 provides special regulating means of the linear and angular position of the mirrors 36 as well, similar to those ones of the above-described type for the lighting devices 21 and 22 and for the television cameras 24.

The mirrors 36 are in particular supported by the same bracket 29 which supports the second lighting device 22 and the television cameras 24.

Lastly, in a known way the side inspection station 4 provides the television cameras 39 and a lighting device 40 located on the same side of the conveyor line, and a contrast screen 41 located on the opposite side of the conveyor line.

By way of example in the following a set of possible setting parameters of the top inspection cycle of the containers is set forth.

| | |
|---|---|
| Top inspection cycle time | 160 ms ± 10% |
| Tracking time | 120 ms ± 10% |
| Return time | 60 ms ± 10% |
| Number of images acquired per container | Comprised between 6 and 10 |
| Frequency of acquisition | Comprised between 65 and 70 images per second |
| Time for single acquisition | 15 ms ± 10% |
| Exposure time for single aquisition | 200 µs ± 10% |
| Stroboscope Time first and second lighting device | 100 µs ± 10% |
| Stroboscope Time third lighting device | 100 µs ± 10% |
| Stroboscope current first and second lighting device | 200 mA ± 10% |
| Stroboscope current third lighting device | 1000 mA ± 10% |
| Angle of first lighting device (with respect to a horizontal axis) | Comprised between 20° and 30° |
| Angle of second lighting device (with respect to a horizontal axis) | Comprised between 45° and 55° |
| Angle of third lighting device (with respect to a horizontal axis) | Comprised between 35° and 45° |

The inspection machine as conceived herein is susceptible to many modifications and variations, all falling within the scope of the inventive concept; furthermore, all the details are replaceable by technically equivalent elements.

In practice the materials used, as well as the dimensions, can be any according to the needs and the state of the art.

The invention claimed is:

1. An automatic inspection machine for containers and contents thereof, comprising a serial horizontal conveyor line of the containers oriented with a vertical axis through at least one inspection station comprising lighting devices of the containers, at least one television camera for acquiring images of the illuminated containers, wherein said lighting devices at least comprise a first, a second and a third lighting device,
wherein said inspection station is mounted on an oscillating support, said oscillating support has the shape of a plate arranged in a horizontal plane and having a first and a second arm which extend at different angles with respect to the oscillation axis of said oscillating support, said inspection station being mounted on said first arm.

2. The automatic inspection machine according to claim 1, wherein said first, second and third lighting devices have projection axes converging on a same transit zone of said containers.

3. The automatic inspection machine according to claim 1, wherein said projection axes converge with different angles on said transit zone of said containers.

4. The automatic inspection machine according to claim 1, wherein said first, second and third lighting devices are positioned on opposite sides of said conveyor line so as to illuminate said transit zone of said containers from opposite sides.

5. The automatic inspection machine according to claim 1, wherein said first and second lighting devices have a projection axis inclined from the top to the bottom of said containers.

6. The automatic inspection machine according to claim 1, wherein said third lighting device has a projection axis inclined from the bottom to the top of said containers.

7. The automatic inspection machine according to claim 1, wherein said third lighting device emits a colored light.

8. The automatic inspection machine according to claim 1, wherein said conveyor line comprises at least one carousel supported in overhead suspension with a vertical rotation axis.

9. The automatic inspection machine according to claim 1, wherein said carousel has suspension pliers rotating about a vertical axis thereof.

10. The automatic inspection machine according to claim 1, wherein said carousel is actuated in continuous rotation.

11. The automatic inspection machine according to claim 1, wherein said oscillating support is positioned below said carousel.

12. The automatic inspection machine according to claim 1, wherein said oscillating support oscillates about the same rotation axis as said carousel.

13. The automatic inspection machine according to claim 1, wherein a further identical or different inspection station is mounted on said second arm.

* * * * *